(12) United States Patent
Wu et al.

(10) Patent No.: US 8,375,101 B2
(45) Date of Patent: Feb. 12, 2013

(54) METHOD AND DEVICE FOR MESSAGE PROMPTING

(75) Inventors: Yunsheng Wu, Shenzhen (CN); Qiang Dai, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 13/522,734

(22) PCT Filed: Apr. 1, 2011

(86) PCT No.: PCT/CN2011/072383
§ 371 (c)(1),
(2), (4) Date: Jul. 18, 2012

(87) PCT Pub. No.: WO2011/134335
PCT Pub. Date: Nov. 3, 2011

(65) Prior Publication Data
US 2012/0296997 A1 Nov. 22, 2012

(30) Foreign Application Priority Data
Apr. 30, 2010 (CN) .......................... 2010 1 0165598

(51) Int. Cl.
*G06F 15/16* (2006.01)
(52) U.S. Cl. .................... 709/207; 709/204; 709/206
(58) Field of Classification Search ................. 709/204, 709/206, 207
See application file for complete search history.

(56) References Cited

U.S. PATENT DOCUMENTS

| | | | |
|---|---|---|---|
| 5,103,498 A * | 4/1992 | Lanier et al. ................ 706/58 |
| 6,260,035 B1 * | 7/2001 | Horvitz et al. .............. 706/60 |
| 7,546,577 B2 * | 6/2009 | Do et al. ..................... 717/108 |
| 7,602,899 B1 * | 10/2009 | Thenthiruperai ........ 379/265.02 |
| 7,788,204 B1 * | 8/2010 | Thomas ........................ 706/47 |
| 2003/0016238 A1 * | 1/2003 | Sullivan et al. ............. 345/705 |
| 2006/0026013 A1 * | 2/2006 | Kraft ............................. 705/1 |
| 2006/0206573 A1 * | 9/2006 | Horvitz et al. .............. 709/206 |
| 2007/0122789 A1 | 5/2007 | Yoo et al. |
| 2007/0214207 A1 | 9/2007 | Xie |
| 2010/0161544 A1 * | 6/2010 | Song et al. ..................... 706/52 |

FOREIGN PATENT DOCUMENTS

| CN | 101034997 A | 9/2007 |
|---|---|---|
| CN | 101286174 A | 10/2008 |

OTHER PUBLICATIONS

International Search Report in international application No. PCT/CN2011/072383, mailed on Jul. 14, 2011.
English Translation of the Written Opinion of the International Search Authority in international application No. PCT/CN2011/072383, mailed on Jul. 14, 2011.

* cited by examiner

*Primary Examiner* — Hieu Hoang
(74) *Attorney, Agent, or Firm* — Oppedahl Patent Law Firm LLC

(57) ABSTRACT

A message prompting method applied in the field of computer technology is disclosed, which comprises acquiring a feature of an operation of a user on software as well as whether or not the operation is successful, determining a feature group of the feature and its corresponding weight, the feature group containing features of a same category and having a weight which represents a relevance among the features within the group, and determining the message to be prompted to the user according to the weight and a pre-determined threshold in combination with whether or not the operation is successful. A message prompting device is also disclosed. The disclosure prompts software features with better pertinence to a user according to behavior features of the user, provide a personalized way of feature notification, avoid disturbing the user, improve the user experience, enhance friendliness, and can provide effective guidance to the user.

17 Claims, 4 Drawing Sheets

METHOD AND DEVICE FOR MESSAGE PROMPTING

TECHNICAL FIELD

The present disclosure relates to a computer technology, and more particularly to a method and device for message prompting applied in software.

BACKGROUND

In order to achieve a better user experience, existing software has begun to recognize the prompts given to software users. These prompts include the prompts for new features possessed by the software and the prompts for resolution to the problem encountered by a software user. However, existing software sends the same fixed prompts to every user. If there are too many prompts, they can become a disturbance to some users, but if there are too few prompts, the software fails to satisfy the needs of some users.

Thus, existing message prompt technologies have the following problems:

1) The same prompt content to all the users becomes a disturbance to some users but fails to satisfy the needs of the other users. For instance, for the users who do not download instant communication music via multimedia ring-back tones, a prompt for multimedia ring-back tone download interface is in most cases a distraction, which interrupts the thoughts of the user and disturbs, or affects, the normal use of the software by the user. Therefore, the distractions caused by prompts degrade the user experience.

2) Existing prompts are not pertinent enough for every user to address the problems occurring during use of a piece of software. For instance, since the same software may be applied in different hardware environments, the versions of operating systems change frequently, and the installed application programs vary significantly, thus a variety of different problems occur during the operation of the software, including misoperations on the software and functional abnormalities in the software. Therefore, there is a need for a more effective prompt method to address the problems above.

SUMMARY

In view of the problems above, a message prompting method and device are provided in embodiments of the present disclosure, which prompt messages according to the behavior features of each specific user operating the software so as to provide more effective prompts to the user.

In order to address the technical problem, the embodiments of the present disclosure are realized by the following technical solutions.

A message prompting method is provided, which includes acquiring a feature of an operation of a user on software as well as whether the operation is successful or not; determining a feature group of the feature and its corresponding weight, wherein the feature group contains features of a same category and has a weight which represents a relevance among the features within the group; and determining a message to be prompted to the user according to the weight and a pre-determined threshold in combination with whether the operation is successful or not.

A message prompting device is provided, which includes:

an acquisition unit arranged to acquire a feature of an operation of a user on software as well as whether the operation is successful or not;

a determination unit arranged to determine a feature group of the feature and its corresponding weight, wherein the feature group contains features of a same category and has a weight which represents a relevance among the features within the group; and a prompt unit arranged to determine a message to be prompted to the user according to the weight and a pre-determined threshold in combination with whether the operation is successful or not.

It can be seen from the technical solution provided herein that the embodiments of the present disclosure prompt software features with better pertinence to a user according to the user behavior features provide a personalized solution of feature notification, therefore can avoid disturbing the user, improve the user experience, enhance friendliness, and provide effective guidance to the user.

DETAILED DESCRIPTION

The technical solution provided in embodiments of the present disclosure will be clearly and completely described below with reference to accompanying drawings, it should be appreciated that the embodiments described herein are merely part of, but not all of, the possible embodiments of the present disclosure, and that other embodiments devised by those of ordinary skill in the art based on the embodiments herein without making creative efforts are within the protection scope of the present disclosure.

Figure 1:
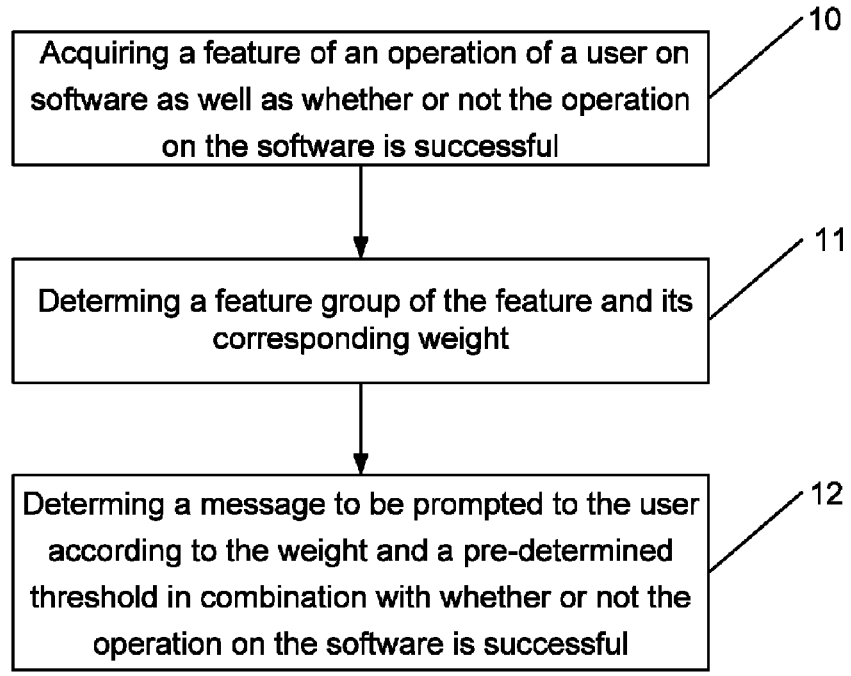
FIG. 1 is a schematic diagram illustrating the flow of a message prompting method according to an embodiment of the present disclosure.

A message prompting method is provided according to an embodiment of the present disclosure, which, as shown in FIG. 1, comprises the following steps:

Step 10: acquiring a feature of an operation of a user on software as well as whether the operation on the software is successful or not;

Step 11: determining a feature group of the feature and its corresponding weight;

Step 12: determining a message to be prompted to the user according to the weight and a pre-determined threshold in combination with whether the operation on the software is successful or not.

In Step 10, the user operates software in such a manner that each operation corresponds to one feature of the software; acquiring the feature of the operation of the user on the software, for example, player software, refers to acquiring a feature 'capture video' when the user carries out a video capturing operation, or a feature 'adjust volume' when the user adjusts the volume.

Figure 2:
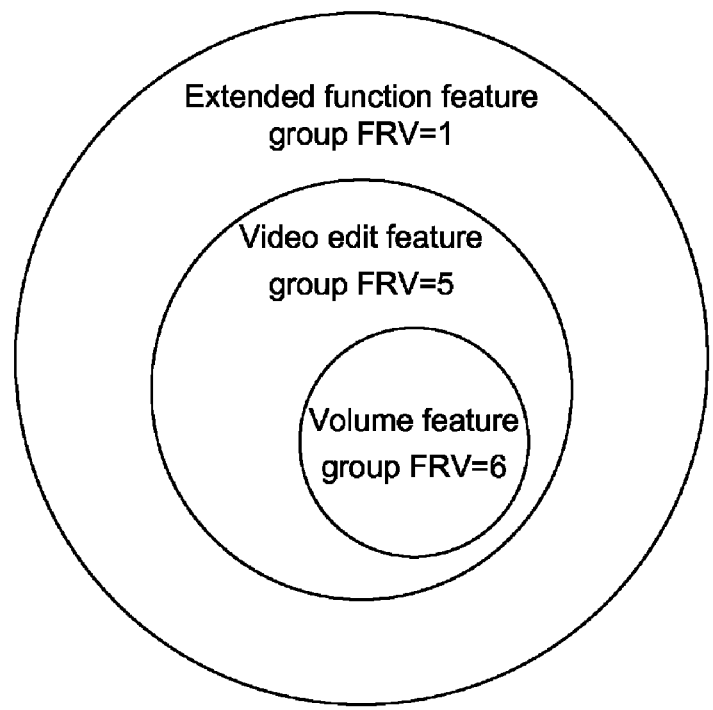
FIG. 2 is a schematic diagram illustrating the feature groups of player software according to an embodiment of the present disclosure.

In Step 11, the feature group is a pre-classified feature group which contains features of the same category and has one weight for representing the relevance among the features within the group. That is, in order to describe the relevance among the features of the software better, the features of the software are categorized according to a plurality of dimensions in each of which a multilevel categorization is supported. The features categorized into the same category constitute a feature group which is endowed with a weight that may be referred to as a Feature Related Value (FRV), wherein the higher the FRV is, the higher the relevance among the features within a feature group is, and vice versa Feature groups may be contained within each other. In the case where the use of one feature needs the display of another feature, the weight of the feature group of the another feature is set to be higher than that of the feature group of the feature. As shown in FIG. 2, for instance, player software may include the following feature groups: an extended function feature group (FRV=1), a video edit feature group (FRV=5) and a volume feature group (FRV=6), wherein the extended function feature group contains the video edit feature group to which features 'capture video' and 'capture GIF' belong and the volume feature group to which features 'press key 'up' (↑) to increase volume by 10 times' and 'automatic volume gain' belong.

The embodiments of the present disclosure make no specific limitation to the representation or categorization of feature groups. For instance, a tree structure may be adopted to represent the relevance among features with the relation between the nodes of the tree as well as the weights of the nodes.

Alternatively, a display time may be set for each feature within the feature group, which is the duration for displaying a feature every time the feature is prompted to the user.

Message prompts are described herein based on examples including feature informing message prompt and error solution message prompts, however, the embodiments of the present disclosure make no limitation to such message prompts. A feature informing message prompt is a prompt informing a software user of certain functions and operation procedures as well as features thereof, which is useful to a software user who is unfamiliar with the functions of the software and can only search for a software function passively, especially when the software is updated with its functions changed. An error solution message prompt refers to a prompt offered by the software to the user for addressing a problem that may occur during use of the software due to an inherent fault in the software, an error operation by the user or a change in the software/hardware application environment of the software leading to an abnormality in the use of the software.

In Step 12, the threshold includes an upper threshold and a lower threshold, and the step of determining the message to be prompted to the user according to the weight and a predetermined threshold in combination with whether or not the operation on the software is successful comprises:

prompting no message to the user if the weight is lower than the lower threshold;

prompting, if the weight is greater than or equal to the lower threshold but smaller than or equal to the upper threshold, other features within the feature group of the feature to the user when the operation of the user on the software is successful or an error relevant to the feature group if the operation is failed; and prompting, if the weight is greater than the upper threshold, other features within the feature group of the feature as well as features in another feature group having a weight above the lower threshold to the user when the operation of the user on the software is successful or an error relevant to the feature group when the operation of the user on the software is failed.

The step of prompting other features within the feature group of the feature to the user comprises:

prompting randomly the other features within the feature group of the feature to the user; or prompting in sequence the other features within the feature group of the feature to the user.

For player software, the lower threshold MinFRV is set to be 5 and the upper threshold MAXFRV is set to be 6.

If the current operation is 'open video' and the FRV of the feature group is 1, then no feature is prompted as FRV is smaller than MinFRV.

If the current operation is 'capture GIF' and the FRV of the feature group is 5, as FRV is equal to MinFRV, a prompt 'capture video' is given, that is, the other features within the feature group of the feature 'capture GIF' are prompted to the user, if the operation is successful, or an error prompt, such as a prompt "please switch to a compatible mode due to the failed operation in the high-definition mode", is given if the operation is failed.

If the current operation is 'adjust video brightness', the FRV of the feature group is 8, and the feature group further includes a feature 'adjust video color', as FRV is greater than MAXFRV, a message 'adjust video color' and all the other features (e.g. feature 'capture GIF') in another feature group having a weight greater than the lower threshold are synchronously prompted if the operation is successful, or error corresponding to the feature group is prompted if the operation is failed.

If each feature within the feature group has information about display time, then one alternative within the embodiments of the present disclosure is that the display time of each feature is calculated, and the weight of the feature group is adjusted to be smaller than the lower threshold after the display time of all features respectively exceeds a corresponding given threshold that is set as needed by the user. When the display time of all features exceeds a corresponding given threshold, it indicates that the user has enough time to master each feature and it is therefore unnecessary to display the features. Consequentially, the weight of the feature group may be adjusted to be smaller than the lower threshold to avoid disturbing the user familiar with the prompted content, improve the user experience and enhance friendliness.

Alternatively, the prompt times of each feature within the feature group may be counted in the embodiments of the present disclosure, the weight of the feature group is adjusted to be smaller than the lower threshold when the prompt times of any feature in the feature group reaches a corresponding given threshold that may be set as needed, the exceeding of the prompt times of any feature in the feature group over a corresponding given threshold indicates that all the features within the feature group have been prompted for enough times and it is therefore unnecessary to display the features. Consequentially, the weight of the feature group may be adjusted to be smaller than the lower threshold to avoid disturb the user familiar with the prompted content, improve the user experience and enhance friendliness.

In another alternative, within the embodiment of the present disclosure, the number of times that the user carries out a successful operation on the software can be counted on condition that the operations correspond to a same feature, and the weight of the feature group containing said same feature corresponding to the operations is adjusted to be below the lower threshold when the successful times reaches a given threshold. That is, the operations of the user are counted in the embodiments of the present disclosure, and if the user carries out an operation successfully for many times, then it can be known that the user is familiar with the feature corresponding to the operation and there is no need to display the feature group of the feature as the other features within the feature group of the feature have been displayed for enough times. Therefore, the weight of the feature group of said same feature corresponding to the operations may be adjusted to be lower than the lower threshold to avoid disturbing the user familiar with the operation feature, improve the user experience and enhance friendliness.

By prompting a user-interested software feature based on relevant features, the embodiments of the present disclosure provide a personalized way of feature notification, avoid disturbing the user, improve the user experience and enhance friendliness.

Figure 3:
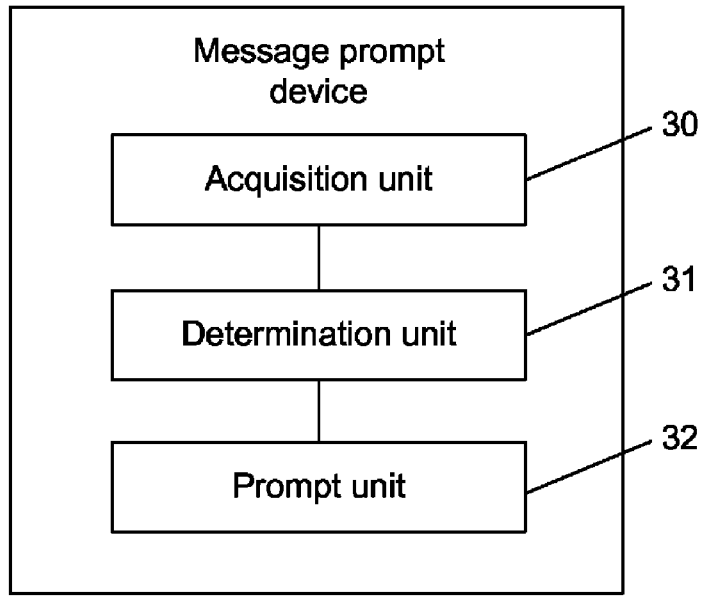
FIG. 3 is a schematic diagram illustrating the structure of a message prompting device according to an embodiment of the present disclosure.

A message prompting device is also provided according to an embodiment of the present disclosure, which, as shown in FIG. 3, includes an acquisition unit 30, a determination unit 31 and a prompt unit 32.

The acquisition unit 30 is arranged to acquire a feature of an operation of a user on software as well as whether the operation on the software is successful or not.

The determination unit 31 is arranged to determine a feature group of the feature and its corresponding weight in the way that is described in the Step 11 above, and is therefore not described here repeatedly, the feature group contains features of a same category and has a weight which represents a relevance among the features within the group.

The prompt unit 32 is arranged to determine a message to be prompted to the user according to the weight and a pre-determined threshold in combination with whether the operation on the software is successful or not, wherein the threshold may include an upper threshold and a lower threshold.

The cooperation process of the acquisition unit 30, the determination unit 31 and the prompt unit 32 may be as follows: the acquisition unit 30 acquires the feature of the operation of a user on software as well as whether the operation on the software is successful or not and sends the acquired feature of the operation of the user on the software to the determination unit 31, wherein the user operates the software in such a manner that each operation corresponds to one feature of the software; the determination unit 31 determines the feature group of the feature and its corresponding weight with reference to pre-classified feature groups; and the prompt unit 32 acquires whether or not the operation of the user on the software is successful from the acquisition unit 30 and the weight from the determination unit 31, compares the weight with a predetermined threshold, and determines the message to be prompted to the user according to the weight and a pre-determined threshold in combination with whether or not the operation on the software is successful.

Figure 4:
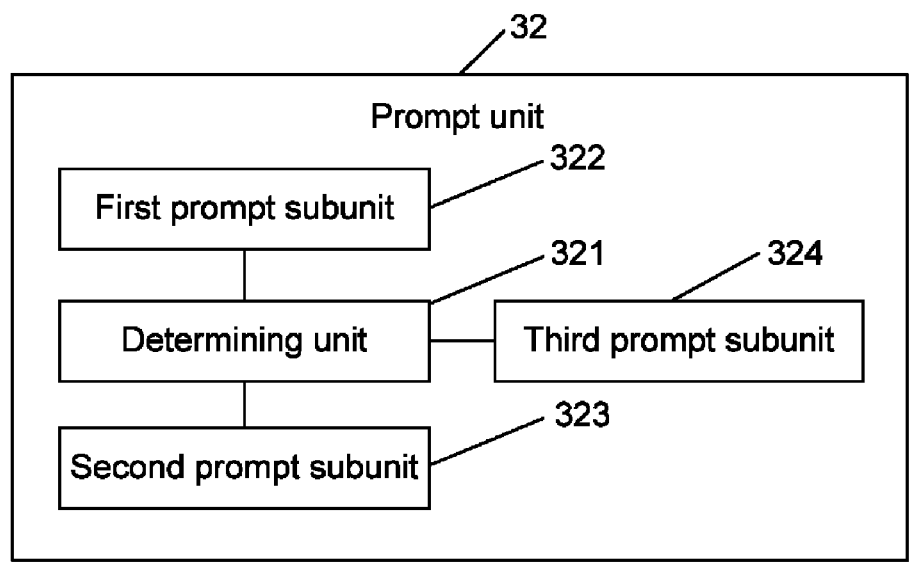
FIG. 4 is a schematic diagram illustrating the structure of the prompt unit of a message prompting device according to an embodiment of the present disclosure.

As shown in FIG. 4, the prompt unit 32 may include a determining unit 321, a first prompt subunit 322, a second prompt subunit 323, and a third prompt subunit 324.

The determining unit 321 is arranged to determine which one of the weight and the threshold is greater;

if the weight is greater than or equal to the lower threshold but smaller than or equal to the upper threshold, the first prompt subunit 322 is arranged to prompt other features within the feature group of the feature to the user when the operation of the user on the software is successful;

if the weight is greater than the upper threshold, the second prompt subunit 323 is arranged to prompt other features within the feature group of the feature as well as the features within another feature group having a weight above the lower threshold to the user when the operation of the user on the software is successful; and if the weight is greater than or equal to the lower threshold, the third prompt subunit 324 is arranged to prompt an error relevant to the feature group when the operation of the user on the software is failed;

After the determining unit 321 determines which one of the weight and the threshold is greater, the first prompt subunit 322, the second prompt subunit 323 and the third prompt subunit 324 acquires the determination result from the determining unit 321; the first prompt subunit 322 carries out a prompt operation to prompt the other features within the feature group of the feature to the user if the weight is greater than or equal to the lower threshold but smaller than or equal to the upper threshold on condition that the operation of the user on the software is successful; the second prompt subunit 323 carries out a prompt operation to prompt the other features within the feature group of the feature as well as the features in another feature group having a weight greater than the lower threshold to the user if the weight is greater than the upper threshold on condition that the operation of the user on the software is successful; and the third prompt subunit 324 carries out a prompt operation to prompt an error relevant to the feature group if the weight is greater than or equal to the lower threshold on condition that the operation of the user on the software is failed.

The first prompt subunit 322, the second prompt subunit 323 and the third prompt subunit 324 carry out no operation, that is, prompt no message to the user, if the weight is smaller than the lower threshold.

The prompt unit 32 described herein is not limited to the structure above which is merely presented as an embodiment listed by the inventor but not a limitation to the structure of the prompt unit 32.

Figure 5:
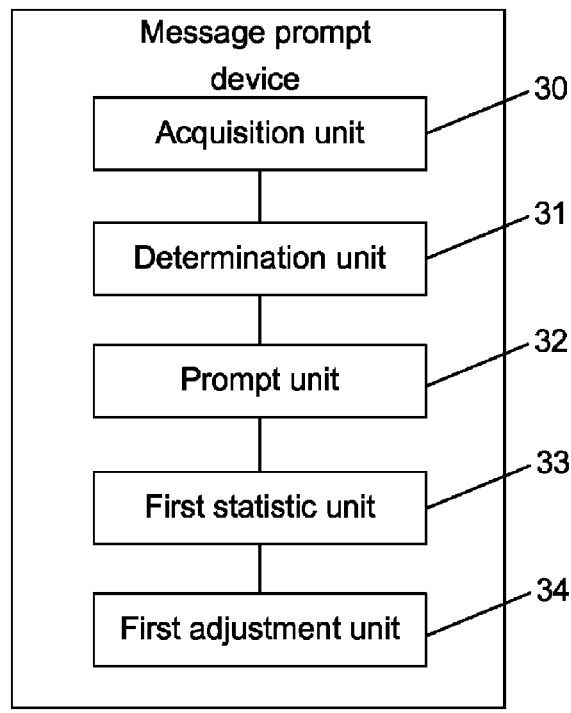
FIG. 5 is a schematic diagram illustrating the structure of a message prompting device according to an embodiment of the present disclosure.

As shown in FIG. 5, the device may further include a first statistic unit 33 and a first adjustment unit 34.

The first statistic unit 33 is arranged to calculate display time of each feature. The first statistic unit 33 may be connected with the prompt unit 32 to calculate the display time of each feature.

The first adjustment unit 34 is arranged to adjust the weight of the feature group to be below the lower threshold after the display time of each feature exceeds a corresponding given threshold. That is, the first adjustment unit 34 carries out an adjustment operation according to the statistic result of the first statistic unit 33, the given threshold corresponding to the a display time may be set as needed, the exceeding of the display time of each feature over a corresponding given threshold indicates that the user has enough time to master each feature and it is therefore unnecessary to display the features. Consequentially, the weight of the feature group may be adjusted to be smaller than the lower threshold to prevent the user from being disturbed by the repeated prompt of the feature group.

Figure 6:
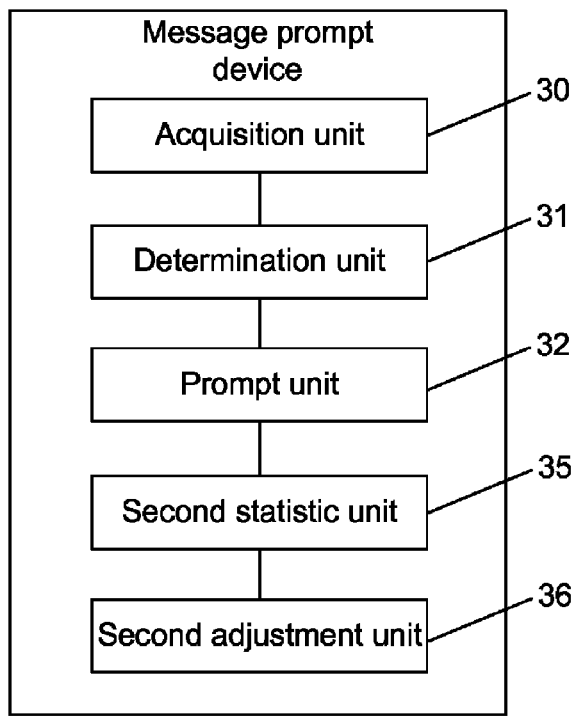
FIG. 6 is a schematic diagram illustrating the structure of a message prompting device according to an embodiment of the present disclosure.

As shown in FIG. 6, the device may further include a second statistic unit 35 and a second adjustment unit 36.

The second statistic unit 35 is arranged to count the prompt times of each feature within the feature group. The first statistic unit 35 may be connected with the prompt unit 32 to count the prompt times of each feature.

The second adjustment unit 36 is arranged to adjust the weight corresponding to the feature group to be below the lower threshold after the prompt times of any feature in the feature group reaches a corresponding given threshold. That is, the second adjustment unit 36 carries out an adjustment operation according to the statistic result of the second statistic unit 35, the threshold set for the prompt times of a feature may be set as needed, and the exceeding of the prompt times of any feature in a feature group over corresponding given thresholds indicates that all the features within the feature group have been prompted for enough times and it is therefore unnecessary to display the features. Consequentially, the weight of the feature group may be adjusted to be smaller than the lower threshold to prevent the user from being disturbed by the repeated prompt of the feature group.

Figure 7:
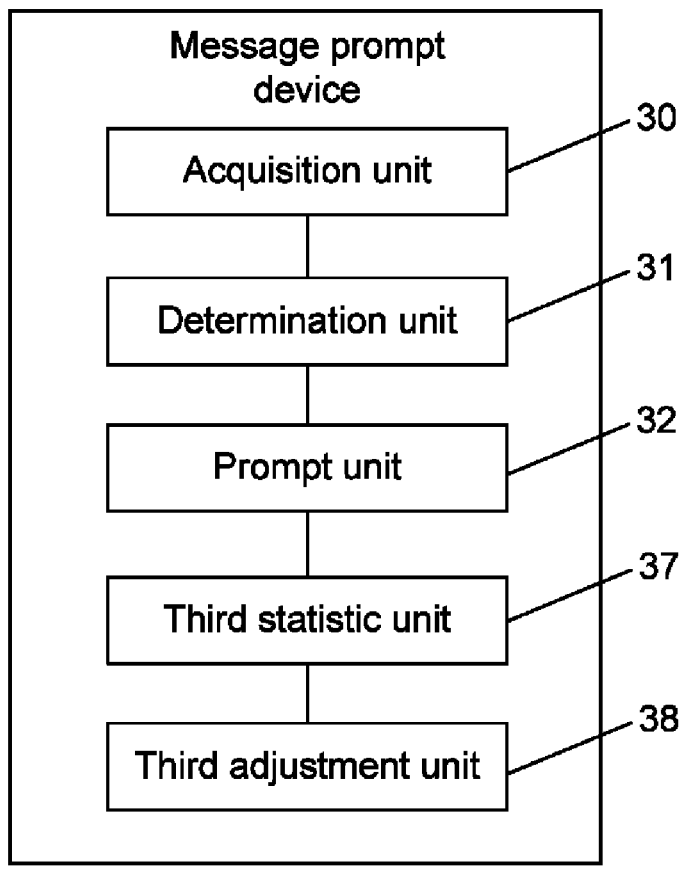
FIG. 7 is a schematic diagram illustrating the structure of a message prompting device according to an embodiment of the present disclosure.

As shown in FIG. 7, the device may further include a third statistic unit 37 and a third adjustment unit 38.

The third statistic unit 37 is arranged to count how many times the user carries out a successful operation on the software on condition that the operations correspond to the same feature, the third statistic unit 37 may be connected with the acquisition unit 30 to count how many times the user carries out a successful operation on the software on condition that the operations correspond to the same feature.

The third adjustment unit 38 is arranged to adjust the weight of the feature group containing said same feature corresponding to the operations to be below the lower threshold after the successful times counted by the third statistic unit 37 reaches a corresponding given threshold. That is, the third adjustment unit 38 carries out an adjustment operation according to the statistic result of the third statistic unit 37, and if an operation has been successfully carried out for many times, then it can be known that indicates that the user is familiar with the feature corresponding to the operation and the other features within the feature group of the feature have been displayed for many times and it is therefore unnecessary to display the features. In this way, the user is prevented from being disturbed by the repeated prompt of the feature group.

By prompting a user-interested software feature based on relevant features, the embodiments of the present disclosure provide a personalized way of feature notification, avoid disturbing the user, improve the user experience and enhance friendliness.

In conclusion, by prompting a user-interested software feature based on relevant features, the embodiments of the present disclosure provide a personalized way of feature notification, avoid disturbing the user, improve the user experience and enhance friendliness.

It should be appreciated by those skilled in the art that all or part of the steps of the method described in the embodiments above may be executed by relevant hardware instructed by a program that may be stored in a computer-readable memory medium. The readable memory medium may be, for example, a read-only memory (ROM), a random access memory (RAM), a magnetic disk or a compact disc.

The embodiments described above are merely preferred ones of the present disclosure but are not limitations to the protection scope of the present disclosure, and any variations or substitutions easily devised by those skilled in the art without departing from the spirit of the present disclosure fall within the scope of the protection. Therefore, the protection scope of the present disclosure shall be subject to that specified by the appended claims.

The invention claimed is:

1. A message prompting method, comprising:
   acquiring, by a computer, a feature of an operation of a user on software as well as whether the operation on the software is successful or not;
   determining, by the computer, a feature group of the feature and its corresponding weight, wherein the feature group contains features of a same category and has a weight which represents a relevance among the features within the group; and
   determining, by the computer, a message to be prompted to the user according to the weight and a pre-determined threshold in combination with whether the operation on the software is successful or not.

2. The method according to claim 1, wherein the threshold comprises an upper threshold and a lower threshold, and the determining the message to be prompted to the user according to the weight and a pre-determined threshold in combination with whether the operation is successful or not comprises:
   prompting no message to the user if the weight is lower than the lower threshold;
   prompting, if the weight is greater than or equal to the lower threshold but smaller than or equal to the upper threshold, other features within the feature group of the feature to the user when the operation is successful; or prompting an error relevant to the feature group when the operation is failed; and
   prompting, if the weight is greater than the upper threshold, other features within the feature group of the feature as well as features within another feature group having a weight above the lower threshold to the user when the operation is successful; or prompting an error relevant to the feature group when the operation is failed.

3. The method according to claim 2, wherein the prompting other features within the feature group of the feature to the user comprises:
   prompting randomly the other features within the feature group of the feature to the user; or
   prompting in sequence the other features within the feature group of the feature to the user.

4. The method according to claim 2, wherein each feature within the feature group has information about display time, and the method further comprising:
   calculating the display time of each feature; and
   adjusting the weight of the feature group to be below the lower threshold after the display time of all features respectively exceeds a corresponding given threshold.

5. The method according to claim 2, further comprising:
   counting prompt times of each feature within the feature group; and
   adjusting the weight of the feature group to be below the lower threshold when the prompt times of any feature in the feature group reaches a corresponding given threshold.

6. The method according to claim 2, further comprising:
   counting how many times the user carries out a successful operation on the software on condition that the operations correspond to a same feature; and adjusting the weight of the feature group to be below the lower threshold when a number of successful times of operation reaches a given threshold.

7. The method according to claim 3, wherein each feature within the feature group has information about display time, and the method further comprising:
calculating the display time of each feature; and
adjusting the weight of the feature group to be below the lower threshold after the display time of all features respectively exceeds a corresponding given threshold.

8. The method according to claim 3, further comprising:
counting prompt times of each feature within the feature group; and
adjusting the weight of the feature group to be below the lower threshold when the prompt times of any feature in the feature group reaches a corresponding given threshold.

9. The method according to claim 3, further comprising:
counting how many times the user carries out a successful operation on the software on condition that the operations correspond to a same feature; and
adjusting the weight of the feature group to be below the lower threshold when a number of successful times of operation reaches a given threshold.

10. A message prompting device, comprising:
a memory for storing instructions;
a processor for executing the instructions to:
acquire a feature of an operation of a user on software as well as whether the operation is successful or not;
determine a feature group of the feature and its corresponding weight, wherein the feature group contains features of a same category and has a weight which represents a relevance among the features within the group; and
determine a message to be prompted to the user according to the weight and a pre-determined threshold in combination with whether the operation is successful or not.

11. The device according to claim 10, wherein the threshold comprises an upper threshold and a lower threshold, and the processor further executes the instructions to:
determine which one of the weight and the threshold is greater;
prompt, if the weight is greater than or equal to the lower threshold but smaller than or equal to the upper threshold, other features within the feature group of the feature to the user when the operation is successful;
prompt, if the weight is greater than the upper threshold, other features within the feature group of the feature as well as features within another feature group having a weight above the lower threshold to the user when the operation is successful; and
prompt, if the weight is greater than or equal to the lower threshold, an error relevant to the feature group when the operation is failed,
prompt no message to the user if the weight is smaller than the lower threshold.

12. The device according to claim 10, wherein the processor further executes the instructions to:
calculate display time of each feature; and
adjust the weight of the feature group to be below the lower threshold after the display time of all features respectively exceeds a corresponding given threshold.

13. The device according to claim 10, wherein the processor further executes the instructions to:
count prompt times of each feature within the feature group; and
to adjust the weight of the feature group to be below the lower threshold when the prompt times of any feature in the feature group reaches a corresponding given threshold.

14. The device according to claim 10, wherein the processor further executes the instructions to:
count how many times the user carries out a successful operation on the software on condition that the operations correspond to a same feature; and
adjust the weight of the feature group containing the same feature corresponding to the operations to be below the lower threshold when the successful times reaches a corresponding given threshold.

15. The device according to claim 11, wherein the processor further executes the instructions to:
calculate display time of each feature; and
adjust the weight of the feature group to be below the lower threshold after the display time of all features respectively exceeds a corresponding given threshold.

16. The device according to claim 11, wherein the processor further executes the instructions to:
count prompt times of each feature within the feature group; and
adjust the weight of the feature group to be below the lower threshold when the prompt times of any feature in the feature group reaches a corresponding given threshold.

17. The device according to claim 11, wherein the processor further executes the instructions to:
count how many times the user carries out a successful operation on the software on condition that the operations correspond to a same feature; and
adjust the weight of the feature group containing the same feature corresponding to the operations to be below the lower threshold when the successful times reaches a corresponding given threshold.

* * * * *